United States Patent
Blankenship et al.

(10) Patent No.: US 10,477,367 B2
(45) Date of Patent: Nov. 12, 2019

(54) METHODS AND APPARATUSES FOR SCHEDULING FOR COEXISTENCE BETWEEN NB-IOT AND E-MTC

(71) Applicant: TELEFONAKTIEBOLAGET L M ERICSSON (PUBL), Stockholm (SE)

(72) Inventors: Yufei Blankenship, Kildeer, IL (US); Johan Bergman, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/075,907

(22) PCT Filed: Feb. 3, 2017

(86) PCT No.: PCT/IB2017/050609
§ 371 (c)(1),
(2) Date: Aug. 6, 2018

(87) PCT Pub. No.: WO2017/134626
PCT Pub. Date: Aug. 10, 2017

(65) Prior Publication Data
US 2019/0069150 A1    Feb. 28, 2019

Related U.S. Application Data

(60) Provisional application No. 62/292,212, filed on Feb. 5, 2016.

(51) Int. Cl.
*H04W 4/70*    (2018.01)
*H04W 28/20*   (2009.01)
*H04W 68/02*   (2009.01)

(52) U.S. Cl.
CPC ............ *H04W 4/70* (2018.02); *H04W 28/20* (2013.01); *H04W 68/02* (2013.01)

(58) Field of Classification Search
CPC ........ H04W 4/70; H04W 28/20; H04W 68/02
See application file for complete search history.

(56) References Cited

U.S. PATENT DOCUMENTS

| | | | |
|---|---|---|---|
| 2016/0105803 A1* | 4/2016 | Sakhnini | H04L 27/265 455/45 |
| 2016/0134411 A1* | 5/2016 | Frederiksen | H04L 5/0042 370/329 |
| 2016/0212664 A1* | 7/2016 | Uemura | H04W 24/08 |
| 2016/0227513 A1* | 8/2016 | Vajapeyam | H04W 68/005 |

(Continued)

OTHER PUBLICATIONS

Sony, "Coexistence of eMTC and NB-IoT", 3GPP TSG RAN WG1 Meeting #83, R1-156693, Nov. 15, 2015.

(Continued)

*Primary Examiner* — Wayne H Cai

(57) ABSTRACT

A communication device identifies a subset of physical resource blocks, PRBs, within a Long Term Evolution, LTE, system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth, and transmits or receives information via at least one of the eligible PRBs that has been allocated as a NB-IoT PRB, or via the at least one MTC narrowband.

23 Claims, 10 Drawing Sheets

(56) References Cited

U.S. PATENT DOCUMENTS

2016/0295345 A1\* 10/2016 Oh .................. H04W 4/70
2018/0198574 A1\* 7/2018 Papasakellariou .... H04W 48/12

OTHER PUBLICATIONS

Ericsson, "NB-IoT—Design", 3GPP TSG WG1 #83, R1-157419, Nov. 7, 2015.
Alcatel-Lucent et al., "Considerations of Multi-Brand NB-Band NB-IoT", 3GPP TSG RAN WG1 NB-IoT ad-hoc, R1-160180, Jan. 11, 2016.
NTT DOCOMO, "Design and feature for NB-PDSCH", 3GPP TSG RAN WG1 NB-IoT Ad-Hoc Meeting, R1-160166, Jan. 12, 2016.
Panasonic, "Commonality design between eMTC and NB-IoT", 3GPP TSG RAN WG1 Meeting #82bis, R1-155776, Oct. 4, 2015.
Ericsson, "Revised WI: Further LTE Physical Layer Enhancements for MTC", 3GPP TSG RAN Meeting #67, RP-150492, Mar. 9-12, 2015.
Huawei, et al., "Revised Work Item: Narrowband IoT (NB-IoT)", 3GPP TSG RAN Meeting #70, RP-152284, Dec. 7-10, 2015.
"Introduction of Introduction of Rel-13 eMTC feature to LTE RAN1specs", 3GPP TSG RAN Meeting #70, RP-152024, Dec. 7-10, 2015.
Alcatel-Lucent, et al., "Introduction of LC/EC MTC", 3GPP TSG-RAN WG1 Meeting #83, R1-157518, Nov. 15-22, 2015.
Ericsson, "Introduction of LC/CE MTC", 3GPP TSG-RAN WG1 Meeting #83, R1-157918, Nov. 15-22, 2015.
Huawei, "Introduction of Rel-13 features of eMTC in 36.212", 3GPP TSG-RAN1 Meeting #83, R1-157916, Nov. 15-22, 2015.
Motorola Mobility, "Introduction of further LTE Physical Layer Enhancements for MTC", 3GPP Tdoc R1-157926, Dec. 7-10, 2015.

\* cited by examiner

US 10,477,367 B2

METHODS AND APPARATUSES FOR SCHEDULING FOR COEXISTENCE BETWEEN NB-IOT AND E-MTC

CROSS-REFERENCE TO RELATED APPLICATIONS

This application is a national stage application of International Patent Application No. PCT/IB2017/050609, filed Feb. 3, 2017, which claims priority to U.S. Provisional Patent Application No. 62/292,212 filed on Feb. 5, 2016, the subject matter of which are hereby incorporated by references in their entireties.

TECHNICAL FIELD

The disclosed subject matter relates generally to telecommunications. Certain embodiments relate more particularly to certain techniques and technologies for supporting coexistence of Narrowband Internet of Things (NB-IoT) and Enhanced Machine-Type Communications (eMTC) on the same Long Term Evolution (LTE) carrier.

BACKGROUND

Cellular communication systems are currently being developed and improved for machine type communication (MTC), which is a form of communication characterized by lower demands on data rates than for example mobile broadband, but with higher requirements on e.g. low cost device design, better coverage, and ability to operate for years on batteries without charging or replacing the batteries.

Currently, the Third Generation Partnership Project (3GPP) is standardizing Enhanced Machine-Type Communications (eMTC) (See e.g., 3GPP Tdoc RP-150492) as well as Narrowband Internet of Things (NB-IoT) [RP-152284] as part of LTE Release 13 for satisfying all the requirements put forward by MTC type applications, while maintaining backward compatibility with current LTE radio access technology.

eMTC

The eMTC features discussed in 3GPP Tdocs RP-152024 and R1-157926 include a low-complexity user equipment (UE) category called UE category M1 (or Cat-M1 for short) and coverage enhancement (CE) techniques (CE modes A and B) that can be used together with UE category M1 or any other LTE UE category.

All eMTC features (both Cat-M1 and CE modes A and B) operate using a reduced maximum channel bandwidth compared to normal LTE. The maximum channel bandwidth in eMTC is 1.4 MHz whereas it is up to 20 MHz in normal LTE. The eMTC UEs are still able to operate within the larger LTE system bandwidth without problem. The main difference compared to normal LTE UEs is that the eMTCs can only be scheduled with 6 physical resource blocks (PRBs) of 180 kHz each at a time.

The restricted channel bandwidth of at most 6 PRBs also means that system information (known as SIB1-BR or SIB1bis) transmissions that are broadcasted to eMTC UEs need to be restricted to a maximum of 6 PRBs.

To achieve good frequency diversity even though the channel bandwidth is relatively small, frequency hopping across the LTE system bandwidth is applied to the SIB1bis transmissions. The number of frequency positions that the hopping occurs between depends on the LTE system bandwidth. For the largest system bandwidth of 20 MHz, the SIB1bis transmission hops between 4 different narrowbands (NBs) of 6 PRBs each.

3GPP RAN WG1 meeting #83 agreed on the following frequency hopping for SIB1bis:

S is a set of valid DL narrowbands for SIB1bis, the narrowband is indexed in the order of increasing value $S=\{s_0, s_1, s_2, \ldots, s_{K-1}\}$, K=number of valid DL narrowbands for SIB1bis For system BW less than 12 RBs
   SIB1bis is transmitted in narrowband sj where j=PCID mod K For system BW between 12-50 RBs
   1st NB is $s_j$ where j=PCID mod K
   2nd NB is $(s_j+\text{floor}(K/2))$ mod K
   Starting at SFN mod 8=0, SIB1bis transmission cycles through {1st NB, 2nd NB}

For system BW between 51-110 RBs
   1st NB is $s_j$ where j=PCID mod K
   2nd NB is $(s_j+\text{floor}(K/4))$ mod K
   3rd NB is $(s_j+2*\text{floor}(K/4))$ mod K
   4th NB is $(s_j+3*\text{floor}(K/4))$ mod K
   Starting at SFN mod 8=0, SIB1bis transmission cycles through {1st NB, 2nd NB, 3rd NB, 4th NB}

FIG. 1 illustrates how an LTE system bandwidth of 10 MHz (50 PRBs) is divided into 8 NBs of 6 PRBs each. The remaining 50−8*6=2 PRBs can be found at the band edges (and in case of LTE system bandwidths consisting of an odd number of PRBs, the one PRB at the center of the LTE system bandwidth is also unused). The SIB1bis is mapped to the NBs that do not overlap with the central 72 subcarriers where the PSS/SSS/PBCH transmissions may occur—this corresponds to the central 6 PRBs in the 10-MHz example in FIG. 1 (one PRB consists of 12 subcarriers). This means that in this 10-MHz example, the SIB1bis transmission can occur in 6 of the 8 NBs, as marked with "narrowband index SIB1bis" in the 3rd column of FIG. 1. For a cell of 10 MHz (=50 PRBs) system bandwidth, frequency hopping of SIB1bis occurs between 2 narrowbands. Thus for a given cell of a particular PCID value, frequency hopping of SIB1bis occurs between 2 narrowbands, which are chosen from the 6 NBs using the equation above.

Furthermore, to achieve inter-cell interference randomization between different cells in the network, these up to 4 frequency positions depend on the physical cell identity (PCID) of the cell, which means that the frequency positions for SIB1bis transmission can be different in different cells.

The UE knows the PCID of the cell from the synchronization signals (PSS and SSS) in the cell and it knows the LTE system bandwidth and system frame number (SFN) from the master information block (MIB) conveyed on the physical broadcast channel (PBCH) in the cell.

The eMTC UE furthermore receives information about the SIB1bis scheduling in the MIB. 5 bits in the MIB are used to encode information about the transmission block size (TBS) of the SIB1bis and the number of repetitions (R) within an 80-ms scheduling period as described in Table 1. As can be seen from the table, only 19 of the 32 possible values of these 5 bits are currently used. This is described, for instance, in 3GPP Tdoc R1-157926, section 7.1.7.2.7.

TABLE 1

| SIB1bis scheduling information in MIB | | |
|---|---|---|
| Value | TBS | R |
| 0 | No SIB1bis transmission in the cell | |
| 1 | TBS1 | 4 |
| 2 | TBS1 | 8 |

TABLE 1-continued

SIB1bis scheduling information in MIB

| Value | TBS | R |
|---|---|---|
| 3 | TBS1 | 16 |
| 4 | TBS2 | 4 |
| 5 | TBS2 | 8 |
| 6 | TBS2 | 16 |
| 7 | TBS3 | 4 |
| 8 | TBS3 | 8 |
| 9 | TBS3 | 16 |
| 10 | TBS4 | 4 |
| 11 | TBS4 | 8 |
| 12 | TBS4 | 16 |
| 13 | TBS5 | 4 |
| 14 | TBS5 | 8 |
| 15 | TBS5 | 16 |
| 16 | TBS6 | 4 |
| 17 | TBS6 | 8 |
| 18 | TBS6 | 16 |
| 19-31 | Reserved | |

Furthermore, 3GPP RAN WG1 meeting #83 agreed on the following regarding paging-related transmissions:
How to indicate set of M-PDCCH narrowband(s) for paging
  implicit mapping
    1st narrowband=PCID mod N_NB_paging
    Other narrowbands are in consecutive order from 1st narrowband with wrap-around
  When more than one narrowband is configured for M-PDCCH for paging
    The narrowband is up to RAN2

The specifications are not finalized yet but what this means is that also paging-related transmissions may occur in 6-PRB narrowband which is determined by the PCID.

NB-IoT operation modes

For NB-IoT, three different operation modes are defined, i.e., standalone, guard-band, and in-band. In standalone mode, the NB-IoT system is operated in a dedicated frequency band, e.g., refarming one or more GSM channels and use it as NB-IoT PRB. For in-band operation, the NB-IoT system can be placed inside the frequency bands used by the current LTE system, while in the guard-band mode, the NB-IoT system can be placed in the guard band used by the current LTE system. The NB-IoT has a system bandwidth of 180 kHz, i.e. substantially smaller than the LTE system bandwidth which is in the range from 1.4 MHz to 20 MHz.

The channel raster of the NB-IoT systems is on a frequency grid of 100 kHz. That is, the NB-IoT devices try to search for the NB-IoT carriers in a step size of 100 kHz. For the standalone deployment where one or more GSM channels are refarmed, this is not a problem since GSM channel bandwidth is 200 kHz and the center frequency is in the 100 kHz grid. But for the in-band and guard-band operations, due to the presence of the DC-carrier and the fact the center of the PRB is in between two sub-carriers, there is no PRB that falls directly on the cell search grid used in LTE in-band operation. The frequency offset to the 100 kHz grid is a minimum of ±2.5 kHz and ±7.5 kHz for even and odd number of PRBs in the LTE system bandwidth, respectively. In an NB-IoT receivers, algorithms can be designed such that the ±2.5 kHz or ±7.5 kHz offset can be handled by the device during the cell search process without degrading the synchronization performance considerably. However, larger offset values are more problematic, and the receiver may not be able to handle larger offsets. Therefore, the NB-IoT carriers are constrained to certain positions for the in-band and guard-band operations.

After the initial cell search phase, the NB-IoT devices need the knowledge of the operation mode to know the reference signal placements, to avoid collisions with legacy systems, and to decode the received data correctly. For in-band and guard-band operations, additional carrier frequency offset caused by channel raster step size, can cause potential performance degradations for NB-IoT devices to decode the Master Information Block (MIB) carried by the Narrow Band Physical Broadcast CHannel (NB-PBCH), especially the devices in really low SNR. Receiver algorithms can help to reduce the degradation, e.g., the receiver can try to hypothesizing and compensate different offset values before the NB-PBCH decoding.

NB-IoT Operation in-Band in LTE Carrier

FIG. 2 shows the center frequency offsets for the LTE PRBs closest to the center frequency of the LTE carrier.

NB-IoT Operation in LTE Guard Band

FIG. 3 illustrates an adjacent LTE PRB for guard band operation in 10 MHz LTE system bandwidth.

In guard band operation, to maintain orthogonality to the LTE carrier and minimize the ACLR to adjacent LTE carrier, placing the NB-IoT PRB on the 15 kHz sub-carrier grid using the 12 "next" subcarriers adjacent to the LTE carrier is desired as shown in FIG. 3 for the 10 MHz LTE system bandwidth.

For the guard-band operation, for an LTE system with 10 or 20 MHz system bandwidth, it is possible to find NB-IoT carrier frequency that is ±2.5 kHz off the 100 kHz frequency raster. For other LTE system bandwidth, the offset to the 100 kHz raster is 52.5 kHz. Therefore, to get within the same ±7.5 kHz to the 100 kHz grid, 3 guard subcarriers are needed. One guard carrier is 15 kHz wide and placed in the same FFT grid at the legacy LTE system that gives orthogonality to the legacy LTE PRB. However, there are no other solutions to put the NB-IoT carriers on the exact 100 kHz raster grids on the LTE guard-band without losing orthogonality to the legacy LTE system.

Table 2 shows the center frequency offset for this adjacent PRB. Only the higher frequency guard band is shown, but the offset is the same to the adjacent PRB in the lower guard band. The 1.4 MHz system bandwidth has been excluded since guard band operation is not seen as feasible.

TABLE 2

Center frequency offset of the guard band PRB for different LTE system bandwidths

| System bandwidth [MHz] | PRBs in system bandwidth | Guard band PRB center frequency offset[kHz] | Offset to 100 kHz grid | Guard subcarriers needed to be with ±7.5 kHz of 100 kHz | Guard band PRB center frequency offset when including guard subcarriers [kHz] |
|---|---|---|---|---|---|
| 3 | 15 | 1447.5 | 52.5 | 3 | 1492.5 |
| 5 | 25 | 2347.5 | 52.5 | 3 | 2392.5 |

TABLE 2-continued

Center frequency offset of the guard band
PRB for different LTE system bandwidths

| System bandwidth [MHz] | PRBs in system bandwidth | Guard band PRB center frequency offset[kHz] | Offset to 100 kHz grid | Guard subcarriers needed to be with ±7.5 kHz of 100 kHz | Guard band PRB center frequency offset when including guard subcarriers [kHz] |
|---|---|---|---|---|---|
| 10 | 50 | 4597.5 | 2.5 | 0 | 4597.5 |
| 15 | 75 | 6847.5 | 52.5 | 3 | 6892.5 |
| 20 | 100 | 9097.5 | 2.5 | 0 | 9097.5 |

SUMMARY

In some embodiments of the disclosed subject matter, a method comprises identifying a subset of physical resource blocks, PRBs, within a Long Term Evolution, LTE, system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth, and transmitting or receiving information via at least one of the eligible PRBs that has been allocated as a NB-IoT PRB, or via the at least one MTC narrowband.

In certain related embodiments, the at least one MTC narrowband comprises an MTC narrowband to be used for transmission of System Information Block 1, SIB1bis.

In certain related embodiments, the at least one MTC narrowband comprises an MTC narrowband to be used for transmission of paging-related information.

In certain related embodiments, identifying the eligible PRBs comprises predefining at least one 6-PRB narrowband as invalid for transmission of System Information Block 1, SIB1bis, and identifying at least one PRB within the predefined narrowbands as eligible for use as a NB-IoT PRB.

In certain related embodiments, identifying the eligible PRBs comprises identifying the eligible PRBs as eligible for use as secondary NB-IoT PRBs, and wherein the at least one of the eligible PRBs is allocated as at least one secondary NB-IoT PRB.

In certain related embodiments, the subset includes only one or more PRBs defined at the outermost edges of the LTE system bandwidth.

In certain related embodiments, identifying the eligible PRBs comprises identifying the eligible PRBs based on at least one of (a) whether the LTE system bandwidth includes an odd or even number of PRBS, and (b) a size of the LTE system bandwidth.

In certain related embodiments, the method further comprises transmitting or receiving configuration signaling indicating whether PRBs identifiable according to a predefined rule are reserved for use as NB-IoT PRBs. The configuration signaling may comprise e.g. particular combinations of values for a set of bits that also indicates scheduling information for a System Information Block 1, SIB1bis.

In certain related embodiments, the method further comprises transmitting or receiving configuration signaling indicating which PRBs within the LTE system bandwidth are reserved for use as NB-IoT PRBs.

In certain related embodiments, the method further comprises transmitting or receiving MTC information via the at least one MTC narrowband, by performing puncturing or rate matching to avoid transmission or reception of the MTC information via the at least one of the eligible PRBs allocated as a NB-IoT PRB.

In certain related embodiments, the method further comprises transmitting or receiving system information or paging-related information via the at least one MTC narrowband according to a frequency hopping pattern which is modified to exclude the at least one of the eligible PRBs allocated as a NB-IoT PRB.

In certain related embodiments, the method further comprises determining, based on a cell identity of a cell in which MTC information is to be transmitted, one or more MTC narrowbands via which to transmit the MTC information, and transmitting or receiving the MTC information via the one or more MTC narrowbands, except for the subset of PRBs identified as eligible for use as NB-IoT PRBs.

In certain related embodiments, the MTC information comprises system information or paging-related information for an MTC system.

In certain related embodiments, the subset of PRBs within the LTE system bandwidth that are eligible for use as NB-IoT PRBs are PRBs that are reserved for use as NB-IoT PRBs.

In certain related embodiments, the method further comprises allocating the at least one of the eligible PRBs as NB-IoT PRBs.

In some embodiments of the disclosed subject matter, an apparatus comprises at least one processor configured to identify a subset of physical resource blocks, PRBs, within a Long Term Evolution, LTE, system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth, and at least one transmitter or receiver configured to transmit or receive information via at least one of the eligible PRBs that has been allocated as a NB-IoT PRB, or via the at least one MTC narrowband.

In some embodiments of the disclosed subject matter, an apparatus comprises means for identifying a subset of physical resource blocks, PRBs, within a Long Term Evolution, LTE, system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth, and means for transmitting or receiving information via at least one of the eligible PRBs that has been allocated as a NB-IoT PRB, or via the at least one MTC narrowband.

In some embodiments of the disclosed subject matter, a non-transitory computer-readable medium has stored thereon a computer program which, when executed by at least one processor of a radio access node, causes the radio access node to identify a subset of physical resource blocks, PRBs, within a Long Term Evolution, LTE, system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth, and transmit or receive information via the at least one of the eligible PRBs that has been allocated as a NB-IoT PRB, or via the at least one MTC narrowband.

BRIEF DESCRIPTION OF THE DRAWINGS

The drawings illustrate selected embodiments of the disclosed subject matter. In the drawings, like reference labels indicate like features.

DETAILED DESCRIPTION

Figure 1:
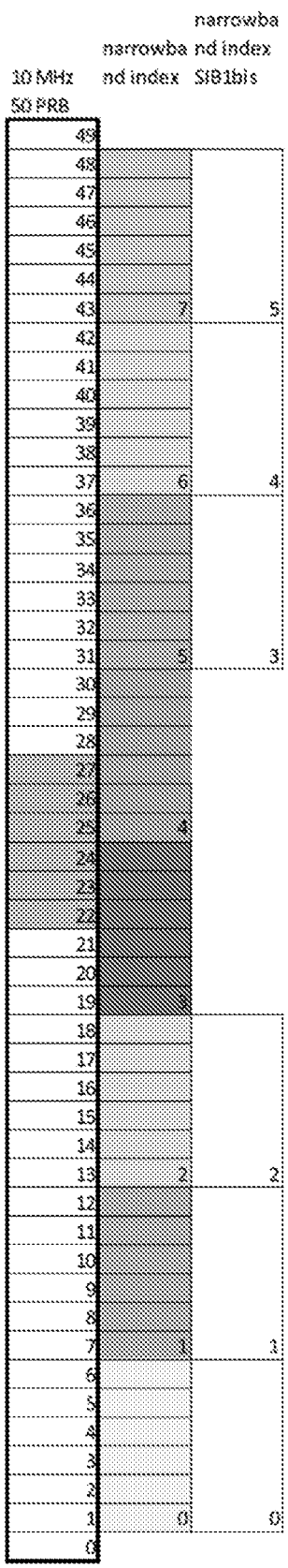
FIG. 1 illustrates a 10 MHz LTE system bandwidth with 8 narrowbands for eMTC and 6 narrowbands allowed for SIB1bis transmission
Figure 2:
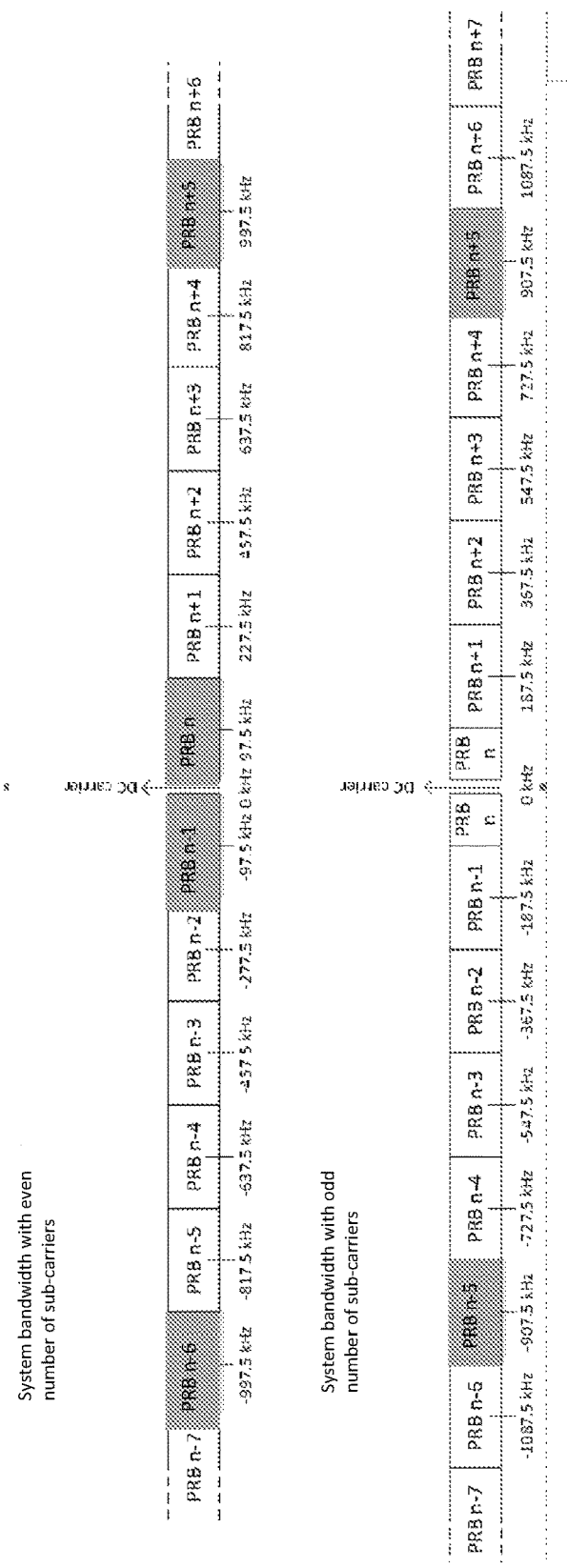
FIG. 2 illustrates a center frequency offset of LTE PRBs for even and odd system bandwidths.
Figure 3:
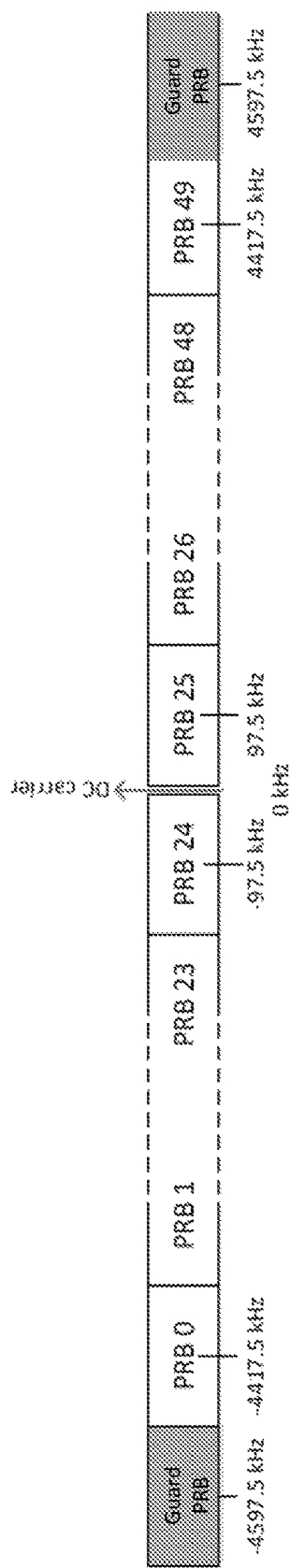
FIG. 3 illustrates an adjacent LTE PRB for guard band operation in 10 MHz LTE system bandwidth.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In the description that follows, certain embodiments are described with respect to eMTC and related terminology. The described concepts, however, are not limited to eMTC technology. Additionally, the general term "MTC" may be used to refer to any version of MTC technology, including e.g. MTC as defined in 3GPP specifications prior to Release 13, as well as eMTC as defined in Release 13 and onward.

In conventional approaches, the specified scheduling in the frequency domain of the system information transmission for eMTC prevents NB-IoT from being efficiently supported on the same LTE carrier. The PRBs that are suitable for NB-IoT transmission collide with PRBs that are used for SIB1bis transmission to eMTC UEs in some cells unless the network planning is arranged such that the PCIDs that cause collision are avoided altogether but this may not be an efficient and practical solution. Similar collision exists for other broadcast type of signal whose narrowbands are determined as a function of PCID, for example, paging transmission.

In recognition of at least the above considerations, in certain embodiments of the disclosed subject matter, within the system information transmission for eMTC, one or more physical resource blocks (PRBs) are made available for NB-IoT so that eMTC and NB-IoT can coexist efficiently on the same LTE carrier. Similar design can be applied to paging transmission as well. These and other embodiments can allow NB-IoT and eMTC to coexist efficiently on the same LTE carrier.

In certain embodiments described below, simultaneous support for eMTC and NB-IoT in a cell is enabled by allowing eNB to arrange downlink transmissions so that collision is avoided between PRBs suitable for NB-IoT deployment and PRBs used for eMTC transmission.

In various alternative embodiments, NB-IoT PRB may be restricted to certain PRB locations in the system BW, or they may be located at any PRB in the system BW. In the description that follows, these two situations are referred to as Case 1 and Case 2, respectively.

Case 1. NB-IoT PRB can Only Reside on Certain PRB Locations in the System BW.

The NB-IoT PRB contains NB-PBCH, NB-PSS and NB-SSS to ensure that the NB-IoT PRB can be used as anchor PRB if necessary. Only the (relatively few) PRBs that fulfill the criterion that they have 2.5 kHz or 7.5 kHz frequency offset compared to the 100-kHz channel raster can be used as anchor PRBs. In this case, for a given NB-IoT UE, one PRB has to be reserved for the NB-IoT traffic. For all the NB-IoT UEs in the cell, several PRBs can be reserved, with each PRB serving a different group of NB-IoT UEs.

To ensure that this NB-IoT PRB(s) does not collide with an eMTC SIB1bis transmission, one of the following methods is used:
 1) Predefine one or more 6-PRB narrowbands as invalid for SIB1bis transmission. One or more PRB(s) in the predefined narrowbands can then be used by NB-IoT UEs. In this method, the invalid narrowbands are fixed and not reconfigurable. While it saves signaling overhead, it has the drawback of inflexibility.
 2) Configure one or more PRBs as invalid for SIB1bis transmission.
 3) Configure one or more narrowbands as invalid for SIB1bis transmission.

One of these methods can also be used for avoiding a similar risk for collision between NB-IoT anchor PRB and transmission related to paging of eMTC UEs.

In the following we focus on the second method, i.e. the configuration method, for the SIB1bis case.

In one embodiment, one of the unused spare bits in MIB is used for indicating that an eMTC UE can assume that a known PRB or set of PRBs will NOT contain any SIB1bis transmission. In an affected 6-PRB narrowband, the eMTC UE will only take the remaining (5) PRBs into account when receiving SIB1bis transmission. The same principle can also be applied to other transmissions than SIB1bis, although a more practical solution may be to simply avoid scheduling those transmissions in the affected PRB(s).

In another embodiment, instead of using unused spare bits in MIB, we use the unused combinations of the 5 bits in MIB that are used for SIB1bis scheduling information (TBS and R). There are 32−19=13 unused combinations that can be used. One example of an extended mapping table is shown in Table 3A. In this example we have chosen to still support all six TBS values but only two of the R values (4 and 8 but not 16) and keep one value reserved.

When "Value" is in the range of 19-30, eNB indicates: yes, "One or more PRBs configured as invalid for SIB1bis transmission to allow NB-IoT transmission in those PRB(s)". Then the predefined one or more PRBs are understood to be invalid for eMTC. The predefined configuration provides the indices of the invalid PRBs.

One example of the predefined rule is based on odd vs even number of PRBs in the system BW:
if the system BW contains even number of PRBs, then PRB of index 2 is reserved for NB-IoT and unusable by eMTC traffic.
if the system BW contains even number of PRBs, then PRB of index 4 is reserved for NB-IoT and unusable by eMTC traffic.

Another example of the predefined rule is based on defining a table of PRB indices for each applicable system BW. For example, Table 3B. Note that while Table 3B uses PRB indices, it is possible to define narrowband indices, as in "narrowbands reserved for NB-IoT".

TABLE 3A

SIB1bis scheduling information in MIB

| Value | TBS | R | One or more PRBs configured as invalid for SIB1bis transmission to allow NB-IoT transmission in those PRB(s) |
|---|---|---|---|
| 0 | | | No SIB1bis transmission in the cell |
| 1 | TBS1 | 4 | No |
| 2 | TBS1 | 8 | |
| 3 | TBS1 | 16 | |
| 4 | TBS2 | 4 | |
| 5 | TBS2 | 8 | |
| 6 | TBS2 | 16 | |
| 7 | TBS3 | 4 | |
| 8 | TBS3 | 8 | |
| 9 | TBS3 | 16 | |
| 10 | TBS4 | 4 | |
| 11 | TBS4 | 8 | |
| 12 | TBS4 | 16 | |
| 13 | TBS5 | 4 | |
| 14 | TBS5 | 8 | |
| 15 | TBS5 | 16 | |
| 16 | TBS6 | 4 | |
| 17 | TBS6 | 8 | |
| 18 | TBS6 | 16 | |
| 19 | TBS1 | 4 | Yes |
| 20 | TBS1 | 8 | |
| 21 | TBS2 | 4 | |
| 22 | TBS2 | 8 | |
| 23 | TBS3 | 4 | |
| 24 | TBS3 | 8 | |
| 25 | TBS4 | 4 | |
| 26 | TBS4 | 8 | |
| 27 | TBS5 | 4 | |
| 28 | TBS5 | 8 | |
| 29 | TBS6 | 4 | |
| 30 | TBS6 | 8 | |
| 31 | | | Reserved |

TABLE 3B

| | LTE system bandwidth | | | | |
|---|---|---|---|---|---|
| | 3 MHz | 5 MHz | 10 MHz | 15 MHz | 20 MHz |
| PRBs reserved for NB-IoT | 2 | 22 | 4 | 2, 72 | 4, 9, 90, 95 |

In yet another method, one or more reserved bits in MIB are used to signal the PRB(s) used for NB-IoT.

In the frequency hopping pattern of SIB1bis, narrowbands containing the NB-IoT PRB(s) are then treated as invalid narrowbands for SIB1bis, and excluded from the frequency hopping pattern.

The MIB bits can indicate:
Existence or not of NB-IoT PRBs;
Number of PRBs for NB-IoT;
PRB indices reserved for NB-IoT;

A table using 3 reserved MIB bits is illustrated in Table 4. Note that while Table 4 uses PRB indices, it is possible to define narrowband indices, as in "narrowbands reserved for NB-IoT".

TABLE 4

| Value of Reserved MIB bits | PRBs reserved for NB-IoT |
|---|---|
| 0 | No PRBs reserved for NB-IoT |
| 1 | 0 |
| 2 | $N_{RB}^{DL} - 1$ |
| 3 | 0, 1 |
| 4 | $N_{RB}^{DL} - 2, N_{RB}^{DL} - 1$ |
| 5 | 0, 1, 2 |
| 6 | $N_{RB}^{DL} - 3, N_{RB}^{DL} - 2, N_{RB}^{DL} - 1$ |
| 7 | |

Note that any PRBs (or narrowbands) indicated as "reserved for NB-IoT" in MIB are then treated by eMTC (UE as well as eNB) as unavailable for eMTC transmission. Either puncturing or rate matching can be applied to avoid the "reserved for NB-IoT" PRBs (or narrowbands).

Case 2. NB-IoT PRB can be any PRB in the System BW.

This is possible when the NB-IoT system is able to operate in the multi-PRB manner, where 2 or more PRBs are used in combination to support NB-IoT UEs.

One PRB is the anchor PRB. Anchor PRB contains NB-PBCH, NB-PSS, NB-SSS. Thus the UE can perform cell search and cell attachment via the anchor PRB. The anchor PRB resides in the guard band.

Another PRB is the secondary PRB. The secondary PRB does not have to contain NB-PBCH, NB-PSS, NB-SSS, although it is allowed to. Thus secondary PRB can use any PRB in band.

As discussed, the secondary PRB can be any PRB in the LTE system bandwidth. Thus it can use any one of the PRB unused by MTC narrowbands at the cell edge. This setup has the benefit that no changes or limitations or signaling are required of the eMTC UEs. The only technique is to allocate the secondary PRBs to a few eligible PRBs. The eligible PRBs are illustrated in Table 5.

TABLE 5

Indices of PRBs usable as a secondary PRB in a multi-PRB setup of NB-IoT

| LTE system BW (MHz) | Indices of PRBs usable as secondary PRB | Comment |
|---|---|---|
| 3 | 0, 14 | One lowest indexed, and one highest indexed PRB in the system BW |
| 5 | N/A | |
| 10 | 0, 49 | One lowest indexed, and one highest indexed PRB in the system BW |
| 15 | 0, 74 | One lowest indexed, and one highest indexed PRB in the system BW |

TABLE 5-continued

Indices of PRBs usable as a secondary
PRB in a multi-PRB setup of NB-IoT

| LTE system BW (MHz) | Indices of PRBs usable as secondary PRB | Comment |
|---|---|---|
| 20 | 0, 1, 98, 99 | Two lowest indexed, and two highest indexed PRB in the system BW |

Processing of PRB(s) Reserved for NB-IoT.

Figure 4:
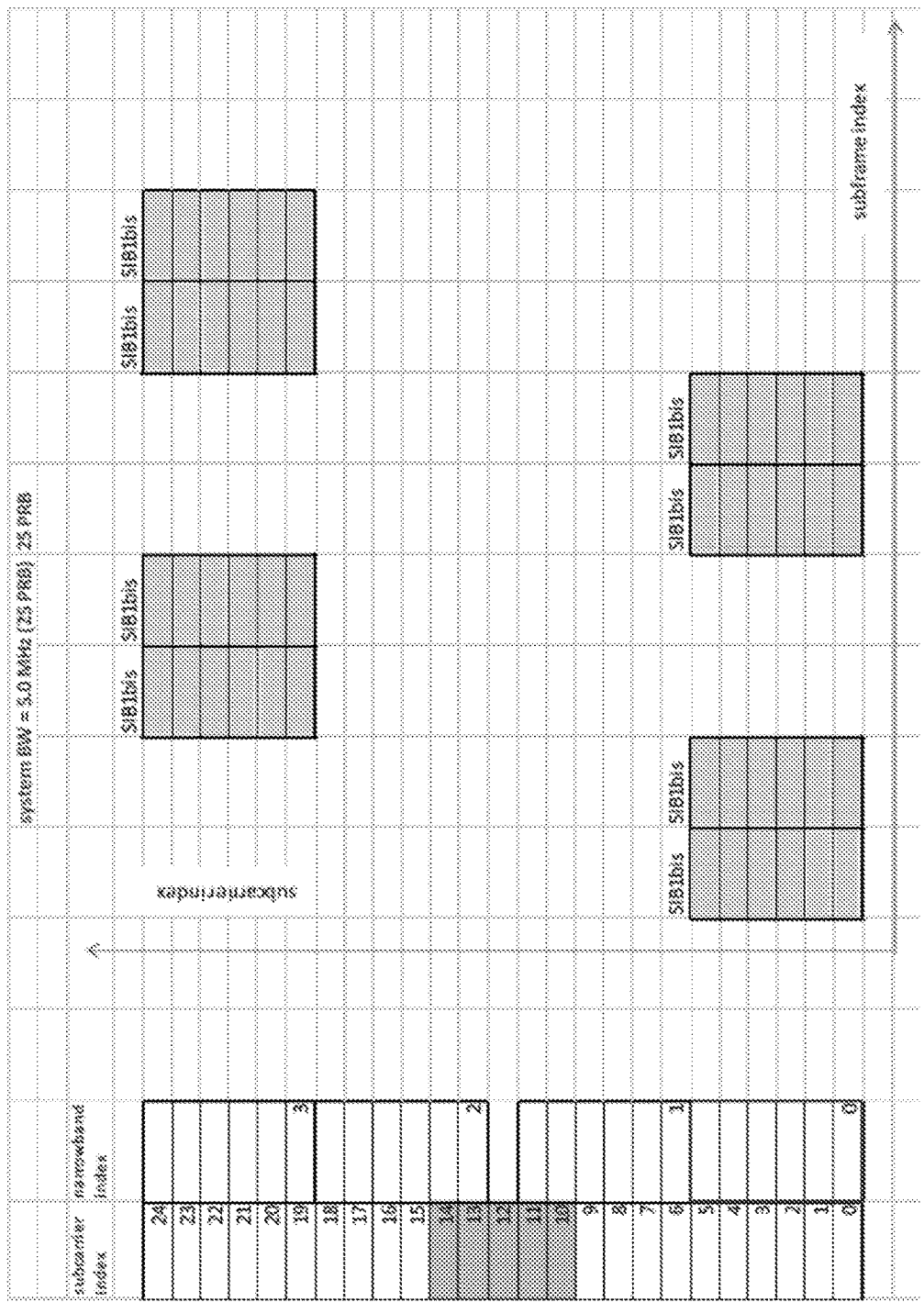
FIG. 4 illustrates eMTC SIBbis transmission with no PRB reserved for NB-IoT according to an embodiment of the disclosed subject matter.
Figure 5:
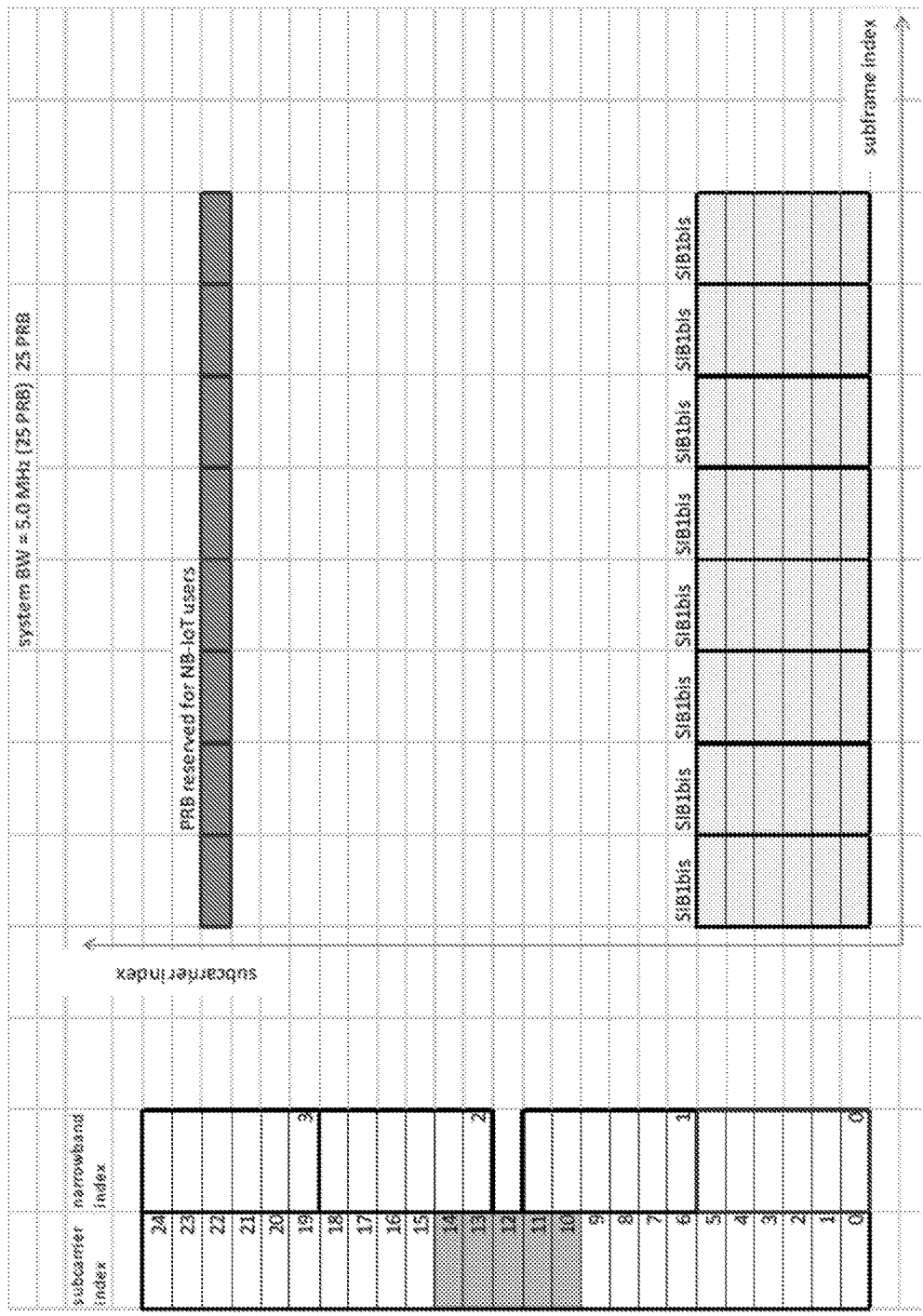
FIG. 5 illustrates eMTC SIBbis transmission with PRB #22 reserved for NB-IoT, and narrowband #3 being treated as an invalid narrowband for SIBbis transmission according to an embodiment of the disclosed subject matter.
Figure 6:
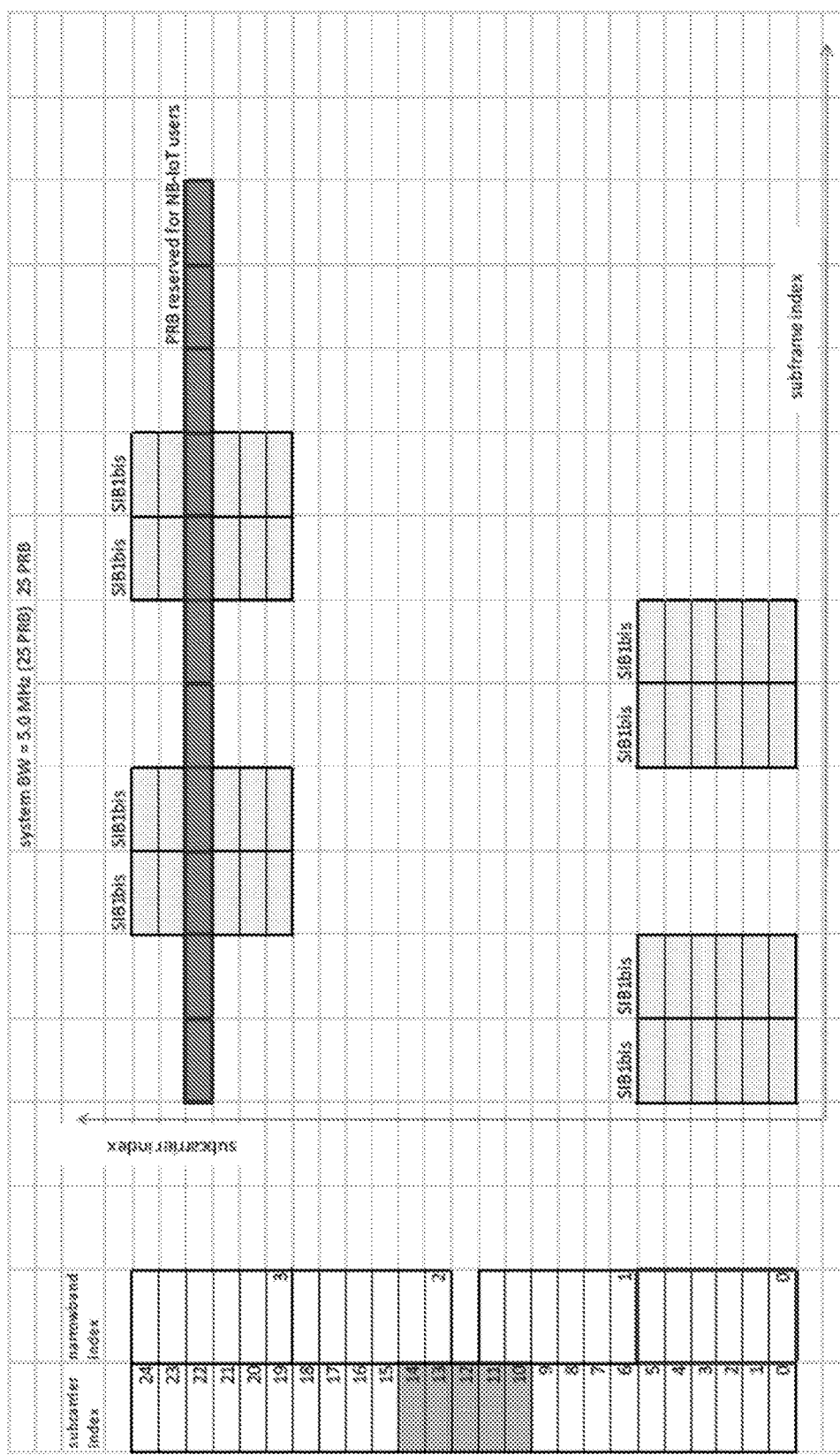
FIG. 6 illustrates eMTC SIBbis transmission with PRB #22 reserved for NB-IoT, with narrowband #3 being treated as a valid narrowband for SIBbis transmission and PRB #22 puncturing SIB1bis transmission according to an embodiment of the disclosed subject matter.

FIG. 4 illustrates a normal SIB1bis transmission where SIB1bis is transmitted in two configured narrowbands. In other words, FIG. 4 illustrates eMTC SIBbis transmission with no PRB reserved for NB-IoT. FIG. 5 illustrates eMTC SIBbis transmission with PRB #22 reserved for NB-IoT, and narrowband #3 being treated as invalid narrowband for SIBbis transmission. FIG. 6 illustrates eMTC SIBbis transmission with PRB #22 reserved for NB-IoT. Narrowband #3 is treated as valid narrowband for SIBbis transmission, but PRB #22 punctures SIB1bis transmission.

Referring to FIGS. 5 and 6, the PRB(s) reserved for NB-IoT can be processed at least with two options. In a first option shown in FIG. 5, eMTC SIBbis transmission with PRB(s) reserved for NB-IoT, and the corresponding narrowband is treated as invalid narrowband for SIBbis transmission. Both eNodeB and the eMTC UE are award the SIBbis transmission avoids the narrowband(s) that contain the PRB(s) reserved for NB-IoT. In a second option illustrated in FIG. 6, eMTC SIBbis transmission with PRB(s) reserved for NB-IoT, and the corresponding Narrowband is still treated as valid narrowband for SIBbis transmission, but the PRB(s) reserved for NB-IoT punctures SIB1bis transmission. The UE should be aware of the location of the PRB(s) reserved for NB-IoT, so that the eMTC UE can take the puncturing into account in its receiver. That is, the eMTC UE discard the symbols transmitted over the PRB(s) reserved for NB-IoT.

The described embodiments may be implemented in any appropriate type of communication system supporting any suitable communication standards and using any suitable components. As one example, certain embodiments may be implemented in an LTE network, such as that illustrated in FIG. 7.

Figure 7:
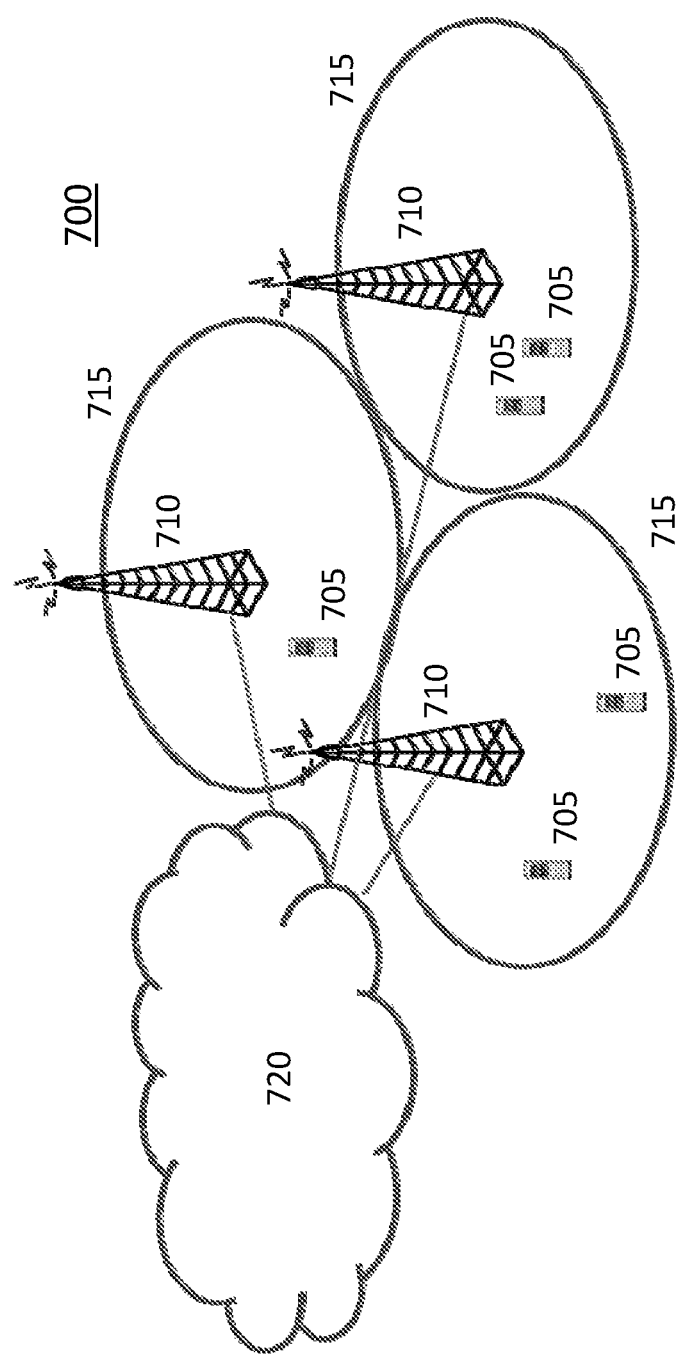
FIG. 7 illustrates a communication network according to an embodiment of the disclosed subject matter.

FIG. 7 illustrates a communication network 700 according to an embodiment of the disclosed subject matter.

Referring to FIG. 7, a communication network 700 comprises a plurality of wireless communication devices 705 (e.g., conventional UEs, machine type communication [MTC]/machine-to-machine [M2M] UEs) and a plurality of radio access nodes 710 (e.g., eNodeBs or other base stations). Communication network 700 is organized into cells 715, which are connected to a core network 720 via corresponding to radio access nodes 710. Radio access nodes 710 are capable of communicating with wireless communication devices 705 along with any additional elements suitable to support communication between wireless communication devices or between a wireless communication device and another communication device (such as a landline telephone).

Figure 8:
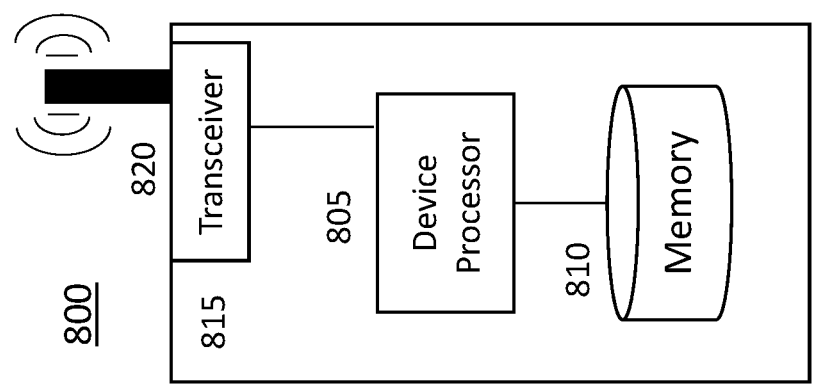
FIG. 8 illustrates a wireless communication device according to an embodiment of the disclosed subject matter.

Although wireless communication devices 705 may represent communication devices that include any suitable combination of hardware and/or software, these wireless communication devices may, in certain embodiments, represent devices such as an example wireless communication device illustrated in greater detail by FIG. 8. Similarly, although the illustrated radio access node may represent network nodes that include any suitable combination of hardware and/or software, these nodes may, in particular embodiments, represent devices such as the example radio access node illustrated in greater detail by FIG. 9.

FIG. 8 illustrates a wireless communication device 800 according to an embodiment of the disclosed subject matter.

Referring to FIG. 8, a wireless communication device 800 comprises a processor 805, a memory, a transceiver 815, and an antenna 820. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 8. Alternative embodiments may include additional components beyond those shown in FIG. 8 that may be responsible for providing certain aspects of the device's functionality, including any of the functionality described herein.

Figure 9:
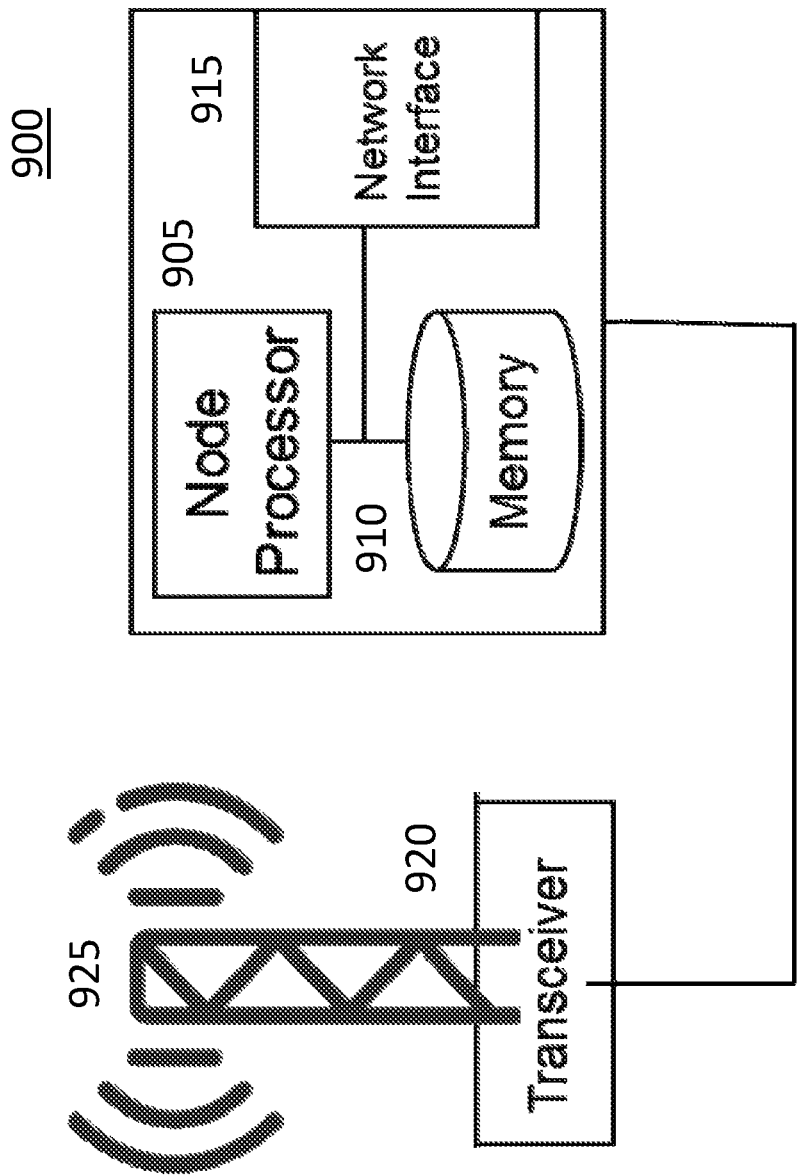
FIG. 9 illustrates a radio access node according to an embodiment of the disclosed subject matter.

FIG. 9 illustrates a radio access node 900 according to an embodiment of the disclosed subject matter.

Referring to FIG. 9, a radio access node 900 comprises a node processor 905, a memory 910, a network interface 915, a transceiver 920, and an antenna 925. In certain embodiments, some or all of the functionality described as being provided by a base station, a node B, an enodeB, and/or any other type of network node may be provided by node processor 905 executing instructions stored on a computer-readable medium, such as memory 910 shown in FIG. 9. Alternative embodiments of radio access node 900 may comprise additional components to provide additional functionality, such as the functionality described herein and/or related supporting functionality.

Figure 10:
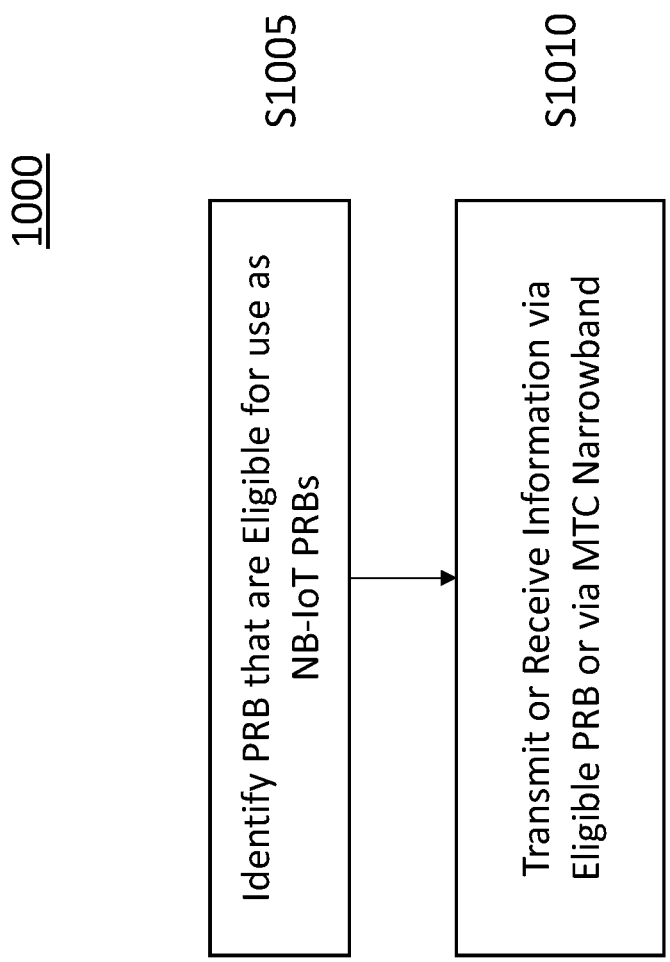
FIG. 10 illustrates a method according to an embodiment of the disclosed subject matter.

FIG. 10 is a flowchart illustrating a method 1000 of operating a radio access node or a wireless communication device according to an embodiment of the disclosed subject matter. The method could be performed, for instance, by a radio access node or wireless communication device such as those illustrated in any of FIGS. 7-9.

Referring to FIG. 10, the method comprises identifying a subset of PRBs within an LTE system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth (S1005). In some embodiments, the eligibility of a PRB for use as an NB-IoT PRB is determined according to whether the PRBs is reserved for use as an NB-IoT PRB, to the exclusion of MTC narrowbands. The method further comprises transmitting or receiving information via at least one of the eligible PRBs that has been allocated as a NB-IoT PRB, or via the at least one MTC narrowband (S1010). For instance, a NB-IoT device may transmit or receive information using the eligible PRBs, or an eMTC device may transmit or receive information using the at least one MTC narrowband.

In some embodiments, the at least one MTC narrowband comprises an MTC narrowband to be used for transmission of System Information Block 1, SIB1bis. In certain alternative embodiments, the at least one MTC narrowband comprises an MTC narrowband to be used for transmission of paging-related information.

In some embodiments, identifying the eligible PRBs comprises predefining at least one 6-PRB narrowband as invalid for transmission of System Information Block 1, SIB1bis, and identifying at least one PRB within the predefined narrowbands as eligible for use as a NB-IoT PRB.

In some embodiments, identifying the eligible PRBs comprises identifying the eligible PRBs as eligible for use as secondary NB-IoT PRBs, and wherein the at least one of the eligible PRBs is allocated as at least one secondary NB-IoT PRB.

In some embodiments, the subset includes only one or more PRBs defined at the outermost edges of the LTE system bandwidth.

In some embodiments, identifying the eligible PRBs comprises identifying the eligible PRBs based on whether the LTE system bandwidth includes an odd or even number of PRBS and/or a size of the LTE system bandwidth.

In some embodiments, the method still further comprises transmitting or receiving configuration signaling indicating whether PRBs identifiable according to a predefined rule are reserved for use as NB-IoT PRBs. The configuration signaling may comprise e.g. particular combinations of values for a set of bits that also indicates scheduling information for a System Information Block 1, SIB1bis.

In some embodiments, the method still further comprises transmitting or receiving configuration signaling indicating which PRBs within the LTE system bandwidth are reserved for use as NB-IoT PRBs.

In some embodiments, the method still further comprises transmitting or receiving MTC information via the at least one MTC narrowband, by performing puncturing or rate matching to avoid transmission or reception of the MTC information via the at least one of the eligible PRBs allocated as a NB-IoT PRB. In some embodiments, the method still further comprises transmitting or receiving system information or paging-related information via the at least one MTC narrowband according to a frequency hopping pattern which is modified to exclude the at least one of the eligible PRBs allocated as a NB-IoT PRB. In some embodiments, the method still further comprises determining, based on a cell identity of a cell in which MTC information is to be transmitted, one or more MTC narrowbands via which to transmit the MTC information, and transmitting or receiving the MTC information via the one or more MTC narrowbands, except for the subset of PRBs identified as eligible for use as NB-IoT PRBs. In some embodiments, the MTC information comprises system information or paging-related information for an MTC system.

In some embodiments, the subset of PRBs within the LTE system bandwidth that are eligible for use as NB-IoT PRBs are PRBs that are reserved for use as NB-IoT PRBs.

In some embodiments, the method still further comprises allocating the at least one of the eligible PRBs as NB-IoT PRBs.

In some embodiments, the method of FIG. 10 may be implemented in an apparatus that comprises at least one processor and at least one transmitter or receiver collectively configured to perform the indicated functions. For instance, the at least one processor may be configured to identify a subset of physical resource blocks, PRBs, within a Long Term Evolution, LTE, system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth. The at least one transmitter or receiver may be configured to transmit or receive information via at least one of the eligible PRBs that has been allocated as a NB-IoT PRB, or via the at least one MTC narrowband. Such an apparatus may be, for instance, a base station or a UE. More generally, the apparatus may include any means for performing the indicated functions, such as a means for identifying a subset of physical resource blocks, PRBs, within a Long Term Evolution, LTE, system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth; and means for transmitting or receiving information via at least one of the eligible PRBs that has been allocated as a NB-IoT PRB, or via the at least one MTC narrowband. Such means may include, for instance, at least one processor and at least one transmitter or receiver as described above. More generally, such means may include any suitable combination of hardware and/or software capable of performing the indicated functions. Such hardware may include e.g. various forms of general purpose or application specific integrated circuits, field programmable gate arrays (FPGAs), and other forms of electronic circuitry.

In still other embodiments, the method of FIG. 10 may be implemented using a computer program comprising instructions which, when executed by at least one processor of a radio access node or wireless communication device, causes the radio access node or wireless communication device to perform the method. In still other embodiments, the method of FIG. 10 may be implemented using a non-transitory computer-readable medium, having stored thereon a computer program which, when executed by at least one processor of a radio access node or wireless communication device, causes the radio access node or wireless communication device to identify a subset of physical resource blocks, PRBs, within a Long Term Evolution, LTE, system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth, and transmit or receive information via the at least one of the eligible PRBs that has been allocated as a NB-IoT PRB, or via the at least one MTC narrowband.

The following abbreviations may be used in this description.

NB Narrow band
NB-IoT Narrowband Internet of Things
MTC Machine Type Communications
PSS Primary Synchronization Sequence
SSS Secondary Synchronization Sequence
SIM Subscriber Identity Module or Subscriber Identification Module
CRC Cyclic Redundancy Check
NB-PSS NB-IoT Primary Synchronization Sequence
NB-SSS NB-IoT Secondary Synchronization Sequence
LTE Long Term Evolution
DFT Discrete Fourier Transform
IFFT Inverse fast fourier transform
CRS Cell Specific Reference Signals
PDCCH Physical Data Control Channel
CP Cyclic prefix
FDD Frequency-division duplex
TDD Time-division duplex
NB-PBCH NB-IoT Physical Broadcast Channel
SNR signal to noise ratios
OFDM Orthogonal frequency-division multiplexing
ZC Zadoff-Chu
CSS common search space (CSS)
USS UE-specific search space (USS)

While the disclosed subject matter has been presented above with reference to various embodiments, it will be understood that various changes in form and details may be made to the described embodiments without departing from the overall scope of the disclosed subject matter.

The invention claimed is:

1. A method comprising:
identifying a subset of physical resource blocks, PRBs, within a Long Term Evolution, LTE, system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth; and
transmitting or receiving information via at least one of the eligible PRBs that has been allocated as a NB-IoT PRB, or via the at least one MTC narrowband,
wherein identifying the eligible PRBs comprises predefining or configuring at least one 6-PRB MTC narrowband as invalid for transmission of an MTC System Information Block 1, SIB1bis, and identifying at least one PRB within the predefined or configured narrowband as eligible for use as a NB-IoT PRB.

2. The method of claim 1, wherein the at least one MTC narrowband comprises an MTC narrowband to be used for transmission of System Information Block 1, SIB1bis.

3. The method of claim 1, wherein the at least one MTC narrowband comprises an MTC narrowband to be used for transmission of paging-related information.

4. The method of claim 1, wherein identifying the eligible PRBs comprises identifying the eligible PRBs as eligible for use as secondary NB-IoT PRBs, and wherein the at least one of the eligible PRBs is allocated as at least one secondary NB-IoT PRB.

5. The method of claim 1, wherein the subset includes only one or more PRBs defined at the outermost edges of the LTE system bandwidth.

6. The method of claim 1, wherein identifying the eligible PRBs comprises identifying the eligible PRBs based on at least one of:
whether the LTE system bandwidth includes an odd or even number of PRBS; and
a size of the LTE system bandwidth.

7. The method of claim 1, further comprising transmitting or receiving configuration signaling indicating whether PRBs identifiable according to a predefined rule are reserved for use as NB-IoT PRBs.

8. The method of claim 7, wherein the configuration signaling comprises particular combinations of values for a set of bits that also indicates scheduling information for a System Information Block 1, SIB1bis.

9. The method of claim 1, further comprising transmitting or receiving configuration signaling indicating which PRBs within the LTE system bandwidth are reserved for use as NB-IoT PRBs.

10. The method of claim 1, further comprising transmitting or receiving MTC information via the at least one MTC narrowband, by performing puncturing or rate matching to avoid transmission or reception of the MTC information via the at least one of the eligible PRBs allocated as a NB-IoT PRB.

11. The method of claim 1, further comprising transmitting or receiving system information or paging-related information via the at least one MTC narrowband according to a frequency hopping pattern which is modified to exclude the at least one of the eligible PRBs allocated as a NB-IoT PRB.

12. The method of claim 1, further comprising determining, based on a cell identity of a cell in which MTC information is to be transmitted, one or more MTC narrowbands via which to transmit the MTC information, and transmitting or receiving the MTC information via the one or more MTC narrowbands, except for the subset of PRBs identified as eligible for use as NB-IoT PRBs.

13. The method of claim 10, wherein the MTC information comprises system information or paging-related information for an MTC system.

14. The method of claim 1, wherein the subset of PRBs within the LTE system bandwidth that are eligible for use as NB-IoT PRBs are PRBs that are reserved for use as NB-IoT PRBs.

15. The method of claim 1, further comprising allocating the at least one of the eligible PRBs as NB-IoT PRBs.

16. An apparatus, comprising:
at least one processor configured to:
identify a subset of physical resource blocks, PRBs, within a Long Term Evolution, LTE, system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth; and
at least one transmitter or receiver configured to transmit or receive information via at least one of the eligible PRBs that has been allocated as a NB-IoT PRB, or via the at least one MTC narrowband,
wherein identifying the eligible PRBs comprises predefining or configuring at least one 6-PRB MTC narrowband as invalid for transmission of an MTC System Information Block 1, SIB1bis, and identifying at least one PRB within the predefined or configured narrowband as eligible for use as a NB-IoT PRB.

17. The apparatus of claim 16, wherein the at least one MTC narrowband comprises an MTC narrowband to be used for transmission of System Information Block 1, SIB1bis.

18. The apparatus of claim 16, wherein the at least one MTC narrowband comprises an MTC narrowband to be used for transmission of paging-related information.

19. The apparatus of claim 16, wherein identifying the eligible PRBs comprises identifying the eligible PRBs as eligible for use as secondary NB-IoT PRBs, and wherein the at least one of the eligible PRBs is allocated as at least one secondary NB-IoT PRB.

20. The apparatus of claim 16, wherein the subset includes only one or more PRBs defined at the outermost edges of the LTE system bandwidth.

21. The apparatus of claim 16, wherein identifying the eligible PRBs comprises identifying the eligible PRBs based on at least one of:
whether the LTE system bandwidth includes an odd or even number of PRBS; and
a size of the LTE system bandwidth.

22. The apparatus of claim 16, wherein the subset of PRBs within the LTE system bandwidth that are eligible for use as NB-IoT PRBs are PRBs that are reserved for use as NB-IoT PRBs.

23. A non-transitory computer-readable medium, having stored thereon a computer program which, when executed by at least one processor of a radio access node, causes the radio access node to:
identify a subset of physical resource blocks, PRBs, within a Long Term Evolution, LTE, system bandwidth that are eligible for use as narrowband internet of things, NB-IoT, PRBs, wherein the eligibility of PRBs for use as NB-IoT PRBs is determined in relation to at least one machine-type-communication, MTC, narrowband within the LTE system bandwidth; and transmit or receive information via the at least one of the eligible PRBs that has been allocated as a NB-IoT PRB, or via the at least one MTC narrowband,
wherein identifying the eligible PRBs comprises predefining or configuring at least one 6-PRB MTC narrowband as invalid for transmission of an MTC System Information Block 1, SIB1bis, and identifying at least one PRB within the predefined or configured narrowband as eligible for use as a NB-IoT PRB.

* * * * *